United States Patent [19]

Sikorski et al.

[11] Patent Number: 5,429,477
[45] Date of Patent: Jul. 4, 1995

[54] VIBRATION DAMPER FOR ROTOR HOUSINGS

[75] Inventors: Siegfried Sikorski; Reinhold Schoenacher, both of Munich; Michael Schober, Munich; Wolfgang Diepolder, Freising, all of Germany

[73] Assignee: MTU Motoren- und Turbinen- Union Munich GmbH, Munich, Germany

[21] Appl. No.: 295,265

[22] Filed: Aug. 24, 1994

[30] Foreign Application Priority Data

Aug. 28, 1993 [DE] Germany .................. 43 29 014.0

[51] Int. Cl.⁶ .................. F01D 25/04; F04D 29/66
[52] U.S. Cl. .................. 415/119; 415/197
[58] Field of Search .................. 415/119, 197, 214.1

[56] References Cited

U.S. PATENT DOCUMENTS

| | | | |
|---|---|---|---|
| 4,531,362 | 7/1985 | Barry et al. | 415/119 |
| 4,705,454 | 11/1987 | Bouiller et al. | 415/119 |
| 4,836,745 | 6/1989 | Hourmouziadis | 415/119 |

FOREIGN PATENT DOCUMENTS 3704197  8/1987  German Dem. Rep. .

*Primary Examiner*—Edward K. Look
*Assistant Examiner*—Michael S. Lee
*Attorney, Agent, or Firm*—W. G. Fasse; W. F. Fasse

[57] ABSTRACT

A vibration damper for rotor housings includes a rubber-elastic damping band (6) that encircles the outer circumference of the rotor housing (4) in a contour fitting manner. A clamping band (7) encircles the damping band (6) and secures the damping band to the housing (4). The clamping band is made of a material having a different modulus of elasticity than the material of the rotor housing, which achieves a detuning of the vibrational system including the rotor housing and the vibration damper as components. Such a detuning reduces the vibrational tendency of the rotor housing. Frictional rubbing between the damping band and the housing surface, and between the damping band and the clamping band effectively damps or dissipates the energy of any vibration that does occur. The clamping band includes a tension adjustment element that is adjustable and releasable so that the clamping band and the entire vibration damper may easily be removed from the housing for carrying out maintenance and inspection procedures.

22 Claims, 1 Drawing Sheet

VIBRATION DAMPER FOR ROTOR HOUSINGS

FIELD OF THE INVENTION

The invention relates to a vibration damper for a rotor housing, and especially for a housing of a turbo-jet engine.

BACKGROUND INFORMATION

A common problem that arises when supporting a rotor within a housing is the vibrational excitation of the housing due to the effects of the rotor during operation. Specifically, both rotor dynamic and aerodynamic effects may cause vibrational excitation of the housing, especially in the case of turbo-jet engine housings. If the housing is vibrationally excited at a frequency near its fundamental or characteristic vibrational frequency, then the housing and the rotor itself can be damaged or even totally destroyed by ever-increasing, undamped vibrations.

For this reason, it has become generally known to damp high frequency vibrations in rotor housings by applying damping lacquer coatings, damping putties or mastics, or damping foils onto the outer circumference of the housing. More specifically, the damping media are applied either around the entire circumference, or only at certain locations or portions of the circumference of the housing. A serious disadvantage of such known damping systems is that it is quite difficult or even impossible to disassemble and remove the damping media, for example to conduct necessary inspections and maintenance, because they are adhesively bonded to the housing.

OBJECTS OF THE INVENTION

In view of the above it is the aim of the invention to achieve the following objects singly or in combination:
  to provide a vibration damper for a rotor housing that effectively reduces the vibration intensity of the housing during operation, yet has a relatively simple mechanical construction with few parts and a relatively low associated cost and complexity;
  to provide a vibration damper for a rotor housing that uses two damping mechanisms, namely frictional dissipation of vibration energy and frequency detuning of the vibrating system by using a material in the vibration damper having a different modulus of elasticity than the material of the rotor housing;
  to provide a vibration damper for a rotor housing that allows easy access to various components of the rotor machine for inspection and maintenance, and that may be easily and quickly disassembled and removed from the housing when necessary to perform inspection and maintenance; and
  to provide a vibration damper for a rotor housing that may be easily adapted to different rotor housings, and that may be easily retrofitted on a rotor machine that has already been completely assembled or even already been in service.

SUMMARY OF THE INVENTION

The above objects have been achieved in a vibration damper according to the invention, essentially including an elastic vibration damping band and a clamping band. The damping band encircles and contacts an outer circumference of the rotor housing in a contour fitting manner so as to provide static friction between the damping band and the housing. The clamping band surrounds or encircles the damping band in a contour fitting manner so as to secure the damping band to the housing. The clamping band is made of a material having a different E-modulus or modulus of elasticity than the material of the rotor housing.

It is an advantage of the vibration damper according to the invention that the constructive cost and effort required is quite low because of the small number of parts, while the damper still provides effective vibration damping. The vibration damper is especially effective because it uses two different mechanisms to damp or reduce the housing vibrations. First of all, the different moduli of elasticity of the housing material and of the clamping band material lead to different vibrational characteristics of these two components, thereby minimizing the intensity of any vibrations in the first place. Secondly, any vibrations that do arise are effectively damped or dissipated by rubbing friction arising both between the damping band and the housing surface and between the damping band and the clamping band.

For optimally achieving the just mentioned vibration damping, it is important that a certain relative movement is possible between the damping band and the housing on the one hand, and between the damping band and the clamping band on the other hand. The relative motion, under a certain contact force, results in the rubbing friction that damps or dissipates the vibration. The contact force of the damping band against the housing necessary for such frictional rubbing is preferably applied and adjusted by means of a tension adjustment element for applying and adjusting the circumferential clamping tension of the clamping band. To further simplify the structure of the vibration damper, the clamping band is embodied as a split band having two free ends, whereby the tension adjustment element is arranged between the two free ends of the clamping band, to apply the desired clamping tension thereto.

For improving the ease of handling, achieving an optimal contact of the clamping band with the damping band, and reducing the weight of the clamping band, the radial thickness of the clamping band increases toward the ends of the clamping band. That is to say, the clamping band is radially thinner over most of its length, and includes radially thicker end portions to which the tension adjustment element is attached.

The clamping band may be loosened or released and then removed by loosening and releasing the tension adjustment element. In this manner the vibration damper, including the clamping band and the damping band, can be easily removed from the rotor housing, so that the housing is easily accessible for carrying out inspection or maintenance procedures. Similarly, any necessary repairs can be performed without any hindrance or limitation, once the damping band is removed from the housing.

The vibration damper may also include appropriate holes or access openings for carrying out inspection or maintenance procedures without removing the clamping band and/or the damping band. Moreover, because other machine components must be attached to the housing at certain locations via struts, flanges, straps or the like, the vibration damper also includes openings for allowing the struts, straps, and the like to pass through. Thus, the vibration damper according to the invention does not hinder the attachment of any auxiliary machine parts, and such parts can be attached to the housing even in the area of the vibration damper.

Because the vibration damper includes a tension adjustment element and access holes as described above, it is easily adapted to different housing shapes, sizes and arrangements. Such adaptability, and easy assembly and disassembly, allow the vibration damper to be retrofitted onto housings of rotor machines that have already been completely manufactured or even already been in service. This is advantageous, for example, when vibration problems first arose or were first discovered after the machine was completely designed and manufactured or after the machine was operating.

In the context of adaptability, it is especially advantageous when the clamping band is composed of several arc-shaped band elements that are coupled together at their ends to form a continuous ring-shaped clamping band. This embodiment is particularly suitable for large rotor housings, or housings that are difficult to access.

In a preferred embodiment of the invention, the damping band completely encircles the housing, that is to say, it surrounds the entire circumference of the housing, with a single continuous ply or layer of damping material. In this manner, the optimum combination of effective damping, minimal structural cost and complexity, and a minimum weight is achieved. Preferably in this context, the width of the damping band is matched to the vibration sensitive length of the housing, that is to say, the portion of the housing that is affected by vibration. Thus, the width of the damping band corresponds to a fraction of the total length of the rotor housing, whereby the width of a single vibration damper is generally sufficient when it is between 5 and 40% of the total length of the rotor housing.

The inner circumferential surface of the damping band is preferably matched or fitted to the outer contour of the rotor housing along the circumference to be enclosed by the vibration damper. More specifically, when the vibration damper is to be used on a housing having external strengthening ribs, for example, the damping band has corresponding grooves formed in its interior circumferential contour for receiving the ribs. This provides the greatest possible surfacial contact between the damping band and the housing surface so as to achieve an optimal vibration damping effect.

An especially effective damping of the vibrating system including as components the rotor, the housing, and the vibration damper is achieved by using a rubber-elastic elastomer for the damping band material. The damping band may also be made of a fiber reinforced material, specifically a glass fiber reinforced plastic, a carbon fiber reinforced plastic, or a synthetic fiber reinforced plastic, for example. The material of the damping band should have a different density and a different modulus of elasticity than the material of the housing. As a result, the different components of the vibrating system have different characteristic vibrational frequencies, whereby the vibration tendency of the housing is significantly reduced.

The damping bands according to the invention can include a strain resistant or non-stretchable insert to prevent any undesirable change in the length of the damping band during installation or assembly of the vibration damper. For example, the strain resistant insert may comprise a circumferential wire or band within the damping band. Furthermore, a protective film or foil may be provided to enclose the damping band so as to protect it from the damaging effects or solvents, oils, synthetic chemicals and the like.

According to a further advantageous embodiment of the invention, the clamping band has a lightweight construction, yet achieves effective damping in cooperation with the damping band. Specifically, the clamping band may be made of a fiber reinforced plastic material, especially with an elastomeric matrix material. Preferably, the modulus of elasticity of the material of the clamping band is different than that of the damping band. Thereby, a further detuning of the vibration system including the rotor, the housing, the damping band and the clamping band is achieved.

The invention is particularly applicable to turbo-jet engines, in which it has been particularly costly and complicated to balance or tune all of the machine components, wherein both rotor dynamic effects and aerodynamic effects can lead to vibrational excitation of the jet engine housing. Particularly in this application, the invention achieves a reduction in housing vibrations while requiring only a low cost and effort.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
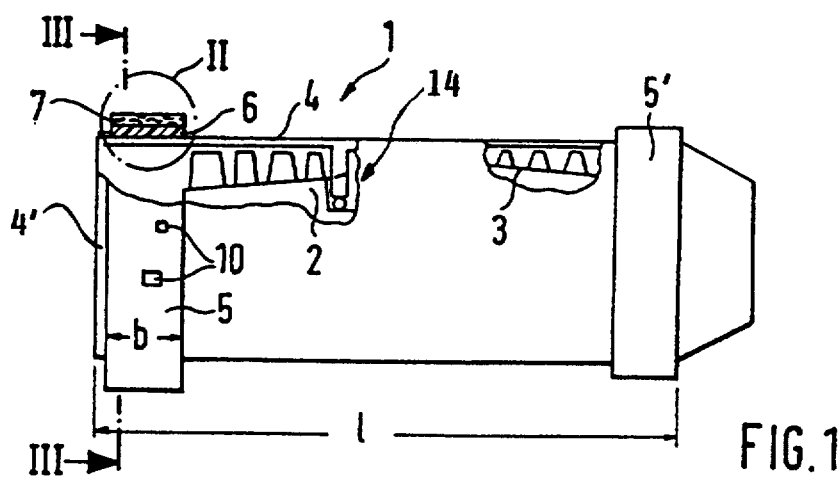
FIG. 1 is a schematic side view in partial section, showing a turbo-jet engine with two vibration dampers according to the invention installed on the engine housing.

As shown in FIG. 1, a turbo-jet engine 1 includes a compressor rotor 2 and a turbine rotor 3. Both the rotors 2 and 3 are supported by bearings 14 in a typical known manner within an engine housing 4. During operation of the engine, the rotors 2 and 3 vibrationally excite the housing 4 due to aerodynamic and rotor dynamic effects. Portions, such as free ends 4', of the rotor housing 4 distant from or not directly connected to the areas of the rotor bearings 14 have a tendency toward increased vibration. In order to reduce or even avoid such vibration, a vibration damper 5 is arranged at the free end 4' of the engine housing 4 in the area of the compressor rotor 2 and a similarly constructed second vibration damper 5' is arranged on the opposite free end of the engine housing 4 in the area of the turbine rotor 3. For the sake of simplicity, the following discussion will refer only to the vibration damper 5, but pertains as well to the similar vibration damper 5'.

The vibration damper 5 is preferably arranged on the housing 4 only in an area of the housing most susceptible to vibration, namely the free end 4' of the housing 4. The width b of the vibration damper 5 is matched to the width of the vibration susceptible area, and corresponds to a fraction of the total length 1 of the turbo-jet engine. More specifically, the width b generally will be between 5 and 40% of the total length 1, and in the embodiment shown in FIG. 1, corresponds to approximately 10% of the total length 1.

As further shown in FIG. 1, the vibration damper 5 includes holes 10, which serve as access holes to ports or removable housing covers of the housing 4. For example, the holes 10 allow access to corresponding ports of the housing 4 for carrying out inspection and maintenance procedures. Furthermore, struts and the like can be connected to the housing 4 through the holes 10 in order to attach auxiliary machine components to the housing 4.

Figure 2:
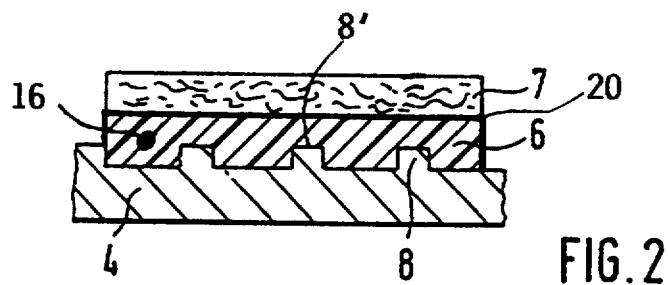
FIG. 2 is an enlarged sectional view corresponding to the detail area II of the vibration damper shown in FIG. 1.

As shown more particularly in FIG. 2, the vibration damper 5 essentially includes a vibration damping band 6 and a clamping band 7. In order to protect the damping band 6 from the damaging effects of oils, solvents, synthetic chemicals and the like, a protective film or foil 20 can be arranged to at least partly cover and enclose the damping band 6.

In order to achieve an optimum damping effect, it is essential that the damping band 6 makes contact with the outer surface of the engine housing 4 over the largest possible area. Therefore the damping band 6 completely encircles and contacts the outer circumference of the barrel-shaped engine housing 4 in a contour fitting or contour mating manner. Because the engine housing 4 comprises stiffening ribs 8 protruding from its outer circumferential surface, the damping band 6 also contacts and encloses these ribs 8 in a contour fitting manner. Thus, the inner surface of the damping band 6 has corresponding grooves 8' for receiving the ribs 8 or any other protrusions of the engine housing 4.

The clamping band 7 is arranged to encircle the radially outer surface or outer circumference of the damping band 6. Thereby, the clamping band 7 secures the damping band 6 to the engine housing 4. Just as the damping band 6 contacts the outer circumference of the engine housing 4 in a contour fitting manner over the largest possible contact surface, the clamping band 7 similarly contacts the damping band 6 in a maximum surface, contour fitting manner. This arrangement forms a frictional surface between the damping band 6 and the clamping band 7, whereby the excitation of vibrations produces a minimal relative motion between the two bands 6 and 7, which generates frictional heat. Thus, the vibration energy is converted into heat energy and dissipated, so as to damp the vibrations. The total damping effect of the vibration damper 5 is largely based on this frictional damping effect, which depends strongly on the selected materials for the damping band 6 and the clamping band 7.

The material of the damping band 6 should be selected to provide a high coefficient of friction between the clamping band 7 and the damping band 6 on the one hand and between the engine housing 4 and the damping band 6 on the other hand. Preferably, the damping band 6 is made of an elastomer material or a fiber reinforced plastic such as a glass fiber reinforced plastic, a carbon fiber reinforced plastic, or a synthetic fiber reinforced plastic. The damping band 6 can further include one or more strain resistant or non-stretchable inserts 16 to prevent any undesirable change in the length of the damping band 6 during installation or assembly of the vibration damper 5. A strain resistant insert 16 is shown schematically, in a general manner, in FIG. 2.

The clamping band 7 is preferably made of a material that can effectively apply the necessary clamping force to hold the damping band 6 in place against the housing 4, and to establish the above described frictional contact between the clamping band 7 and the damping band 6 on the one hand, and between the damping band 6 and the housing 4 on the other hand. The clamping band 7 is preferably made of a fiber reinforced material with an elastomer matrix. Furthermore, the selected material for the clamping band 7 should have a different modulus of elasticity and a different density than the material, i.e. a metal, of the engine housing 4. In a further particular embodiment, the material of the clamping band 7 also has a different modulus of elasticity than the material of the damping band 6.

Due to these differing material properties, a different characteristic vibrational frequency of the clamping band 7 as compared to the engine housing 4 results. The selected materials having different characteristic frequencies achieve a detuning of the vibrational system including as components the engine housing 4 and the vibration damper 5, whereby a resonant vibration of the engine housing 4 relative to the rotors 2 or 3 is avoided or at least significantly reduced.

Figure 3:
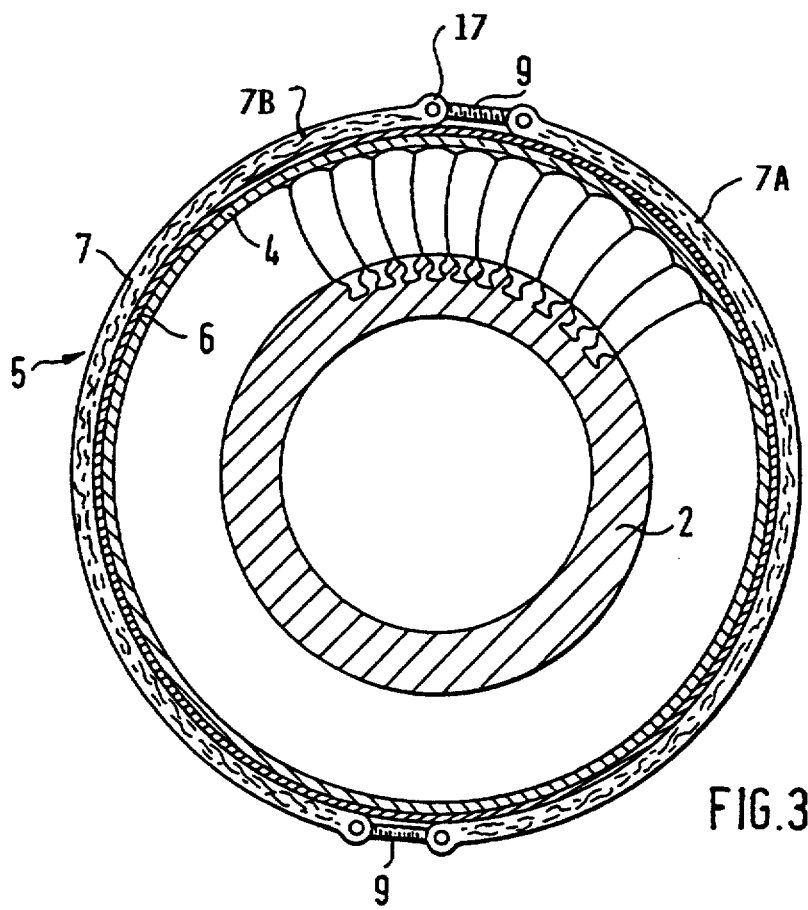
FIG. 3 is a cross-section through the jet engine and through the vibration damper along the line III—III of FIG. 1.

As shown in FIG. 3, the clamping band 7 preferably comprises two or more partial-circular, arcuate band elements 7A and 7B. This embodiment allows the vibration damper 5 to be more easily assembled and installed on engine housings 4. An adjustable and releasable tension adjustment element 9 interconnects the respective adjacent ends 17 of the band elements 7A and 7B to form the continuous ring-shaped clamping band 7. The tension adjustment elements 9 facilitate the installation and removal of the clamping band 7, allow the clamping band 7 to be adapted to different sized housings 4, and especially allow the clamping tension to be adjusted to assure an optimum securing of the vibration damper 5 to the engine housing 4 with an optimally adjusted frictional force between the engine housing 4, the damping band 6 and the clamping band 7.

The end portions 17 of the clamping band elements 7A and 7B preferably have an increased radial thickness relative to the major body portion of the clamping band elements 7A and 7B. In this manner, the total weight of the clamping band 7 may be reduced while still achieving sufficient strength for the clamping band 7 and especially sufficient strength and sufficient material for attaching the tension adjustment elements 9 at the ends 17 of the clamping band elements 7A and 7B.

Although the invention has been described with reference to specific example embodiments, it will be appreciated that it is intended to cover all modifications and equivalents within the scope of the appended claims.

What is claimed is:

1. A vibration damper for a rotor housing made of a housing material, said vibration damper comprising a damping band made of an elastic material having a high coefficient of friction against said housing material, and a clamping band comprising a material having a different modulus of elasticity than said housing material, wherein said damping band is arranged in a frictionally contacting and contour fitting manner on an outer circumferential surface of said housing, and said clamping band is arranged in a contour fitting manner on an outer circumferential surface of said damping band to secure said damping band to said housing.

2. The vibration damper of claim 1, wherein said damping band comprises only a single layer of said elastic material, which encircles said housing substantially completely around said outer circumferential surface of said housing.

3. The vibration damper of claim 1, wherein said damping band comprises a continuous ring of said elastic material.

4. The vibration damper of claim 1, wherein an axial dimension of said damping band is a fraction of a total axial length of said rotor housing and corresponds to a vibration sensitive axial length of said housing.

5. The vibration damper of claim 4, wherein said axial dimension is in the range from 5% to 40% of said total axial length.

6. The vibration damper of claim 1, wherein said damping band comprises an inner circumferential surface having a surface contour mating with said outer circumferential surface of said housing.

7. The vibration damper of claim 6, wherein said outer circumferential surface of said housing comprises protruding ribs and said inner circumferential surface of said damping band comprises grooves corresponding to and receiving said ribs.

8. The vibration damper of claim 1, wherein said elastic material of said damping band is a rubber-elastic elastomer.

9. The vibration damper of claim 1, wherein said elastic material of said damping band is a fiber reinforced composite material.

10. The vibration damper of claim 9, wherein said fiber reinforced composite material is selected from the group consisting of glass fiber reinforced plastics, carbon fiber reinforced plastics and synthetic fiber reinforced plastics.

11. The vibration damper of claim 1, further comprising a tension adjustment element releasably and adjustably connected to said clamping band and applying an adjustable circumferential tension to said clamping band.

12. The vibration damper of claim 11, wherein said clamping band comprises two ends and said tension adjustment element interconnects said ends.

13. The vibration damper of claim 12, wherein said ends have a greater radial thickness than a remaining body portion of said clamping band.

14. The vibration damper of claim 1, wherein said clamping band comprises a plurality of arcuate band elements releasably interconnected end to end.

15. The vibration damper of claim 1, wherein said material of said clamping band is a fiber reinforced composite material.

16. The vibration damper of claim 15, wherein said fiber reinforced composite material of said clamping band is based on an elastomer matrix.

17. The vibration damper of claim 1, wherein said material of said clamping band has a different modulus of elasticity than said elastic material of said damping band.

18. The vibration damper of claim 1, wherein said vibration damper has at least one hole through said clamping band and said damping band.

19. The vibration damper of claim 1, further comprising a protective film arranged at least partially around said damping band.

20. The vibration damper of claim 1, wherein said housing is a turbojet engine housing.

21. The vibration damper of claim 1, wherein said damping band further comprises a strain-resistant insert extending in a circumferential direction.

22. The vibration damper of claim 1, wherein said damping band comprises a continuous ring of said elastic material, which comprises a rubber-elastic elastomer, said clamping band comprises a plurality of arcuate band elements releasably interconnected end to end, said material of said clamping band is a fiber reinforced composite, and said vibration damper further comprises at least one tension adjustment element connected between respective adjacent ones of said ends of said arcuate band elements.

* * * * *